US006499631B2

(12) United States Patent
Zook

(10) Patent No.: US 6,499,631 B2
(45) Date of Patent: Dec. 31, 2002

(54) HOT MELT ADHESIVE APPLICATOR

(75) Inventor: Jon C. Zook, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/769,771

(22) Filed: Jan. 26, 2001

(65) Prior Publication Data

US 2002/0100513 A1 Aug. 1, 2002

(51) Int. Cl.[7] .............................................. F16K 27/00

(52) U.S. Cl. .................... 222/146.6; 222/504; 118/302; 239/135

(58) Field of Search .............................. 222/146.5, 504; 118/302; 239/135

(56) References Cited

U.S. PATENT DOCUMENTS 4,687,137 A * 8/1987 Boger et al. ................ 118/315
4,785,996 A * 11/1988 Ziecker et al. .............. 239/135
5,336,320 A * 8/1994 Hogan et al. ............... 118/300
5,478,224 A * 12/1995 McGuffey ................... 118/302
5,645,743 A 7/1997 Zook ................... 222/146.5 X
5,683,578 A 11/1997 Zook et al. .......... 222/146.2 X
5,806,720 A 9/1998 Zook ....................... 222/146.5
6,260,583 B1 * 7/2001 Flatt et al. ............... 222/146.5

* cited by examiner

*Primary Examiner*—Kenneth Bomberg
(74) *Attorney, Agent, or Firm*—Lowe Hauptman Gilman & Berner, LLP

(57) ABSTRACT

In a hot melt adhesive applicator of a slot die type or other type having an air supply to an adhesive service block through solenoids controlling the ON-OFF of the pneumatic adhesive applicator valves, one or more air valves are directly mounted to the service block through an intervening air supply manifold base plate positioned atop an insulation plate to significantly decrease the air path length and decrease the response time of the air valve. The insulation element may be mounted within an elongate recess formed in the top surface of the service block. The insulation element may be formed with cutouts to reduce the mass of the insulation element and to provide better air insulation exposure between the bottom surface of the valve base manifold and the bottom of the recess exposed by the cutouts.

14 Claims, 4 Drawing Sheets

HOT MELT ADHESIVE APPLICATOR

TECHNICAL FIELD

The present invention relates generally to hot melt adhesive applicators and, more particularly, to hot melt adhesive applicators of a slot die type.

BACKGROUND ART

Hot melt adhesive applicators typically have an air supply provided from a source to a pneumatic adhesive applicator valve located on a service block from which hot melt adhesive under pressure is dispensed. As depicted in FIG. 4, the adhesive applicator valves are operated by external solenoids 24 that control the ON-OFF positions of the pneumatic adhesive applicator valves and thus the ON-OFF dispensing of adhesive. The external solenoids 24 are typically spaced a considerable distance away from the adhesive service block 19 by means of long air tubes 26 and 28 that are used to avoid exposure to the heat generated by the service block which is typically heated to temperatures in a preferred range of 375–450° F. Accordingly, and disadvantageously, the air supply path both from the external solenoids 24, through the air tubes, 26, 28 and then to and through air passages within the service block 19 and finally to the adhesive applicator valves 34, can become so long as to create a time delay that undesirably delays operation by increasing the response time of the applicator valves, causing inconsistencies in the discharge and pattern of adhesive dispensed. This is due to the time needed for the air to fill the entire air path to a pressure suitable for operating the adhesive valves.

It is accordingly one object of the invention to minimize the response time for air to be supplied from the external solenoids to the adhesive applicator valves.

Another object is to improve the reliability in use of hot melt adhesive applicators.

As is common in such applicators, the hot melt adhesive is discharged under pressure through a discharge opening, such as a slot, formed in a die block mounted to the service block. The die block utilizes a separate heat source from that of the service block to allow for better control over the adhesive distribution process or pattern. However, since the die block is mounted directly to the service block, it is difficult to maintain the integrity of the separate heat zones and this also adversely effects control of the adhesive process/pattern.

Accordingly, still another object is to maintain the integrity of the separate heat zones of the service block and die block to allow for better control of the adhesive process/pattern.

DISCLOSURE OF INVENTION

A hot melt adhesive applicator, in accordance with the present invention, comprises an adhesive service block having at least one adhesive applicator or dispenser valve module attached thereto for controlling the supply of adhesives under pressure. A service block heater is connected to heat the service block and the adhesive therein. At least one solenoid operated air valve is operatively connected to the service block assembly for supplying air from a source through appropriate air passages to operate the adhesive applicator valves between open and closed positions to control the flow of adhesive from the service block and into a die block assembly connected to the service block. The die block assembly includes at least one discharge opening of desired shape, such as a slot in the case of a slot die type applicator, from which the adhesive is discharged under pressure.

In accordance with the present invention, contrary to existing applicators, the air valve assembly is mounted directly to the service block as opposed to remotely through air tubes. This direct mounting arrangement eliminates the intermediary of any air supply tubes and minimizes the response time for the air to react and fill the air line chamber that communicates with the adhesive service block and ultimately with the applicator valve. This advantageously decreases the response time of the applicator valve operation.

The air valve assembly is preferably mounted to a valve base manifold, preferably by attachment to an upper surface thereof. An insulation element extends between the manifold and the service block to shield the air valve from excessive heat generated by the service block during operation. Both the valve base manifold and the valve insulator element are formed with air passageways that permit communication between the air valves and the air line chamber formed in the service block.

More specifically, the insulation element has upper and lower surfaces in which the upper surface is in direct contact with a lower surface of the valve base manifold and the lower surface of the insulator is in direct contact with an upper surface of the service block assembly. In this manner, the air flow path between the outlet of the air valve and inlet opening(s) in the air line chamber formed in the service block is defined solely by the thickness of the valve base manifold and the insulation element.

In accordance with a unique feature of the preferred embodiment, the upper surface of the service block assembly is formed with a recess in which is received the insulation element. This recess operates to shorten the air flow path as measured between the air valve outlet and an air inlet opening formed in the upper surface of the air line chamber within the recess. In this preferred embodiment, the insulation element has a thickness equal to the depth of the recess.

In accordance with another unique feature of the preferred embodiment, the insulation element is preferably formed with one or more cutouts or notches that extend the full height of the insulation element in order to reduce the surface area contact between the heated service block and the air valve block. In other words, air acts as an insulator between the service block and air in the cutout area or openings defined between the opposing surfaces of the respective blocks.

In accordance with another feature of this invention, a separate thermal insulation element is positioned between the bottom service of the adhesive service block and the upper surface of the die block. Suitable air passageways are provided through this insulation element to enable hot melt adhesive to be discharged from the service block to the die block assembly. The feature of a separate insulation element between these blocks allows for better control of the process/adhesive pattern by maintaining the integrity of the separate heat zones for the service block and the die block.

The die block is further formed with an internal elongate groove in communication with the air passageways through which hot melt adhesive is applied to a point of application. Preferably, the hot melt groove is polished to allow for a sharper adhesive shut off.

Another feature of this invention involves the use of pins in predetermined adjacent locations along the hot melt groove that are adapted to engage openings formed in a clamp that is clamped a to cover the hot melt groove. The feature of providing location pins between the clamp and groove allows for a rapid reattachment of the clamp to the die block assembly following clamp removal for better access and cleaning of the hot melt groove.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as a restrictive.

BEST MODE FOR CARRYING OUT THE INVENTION

Figure 1:
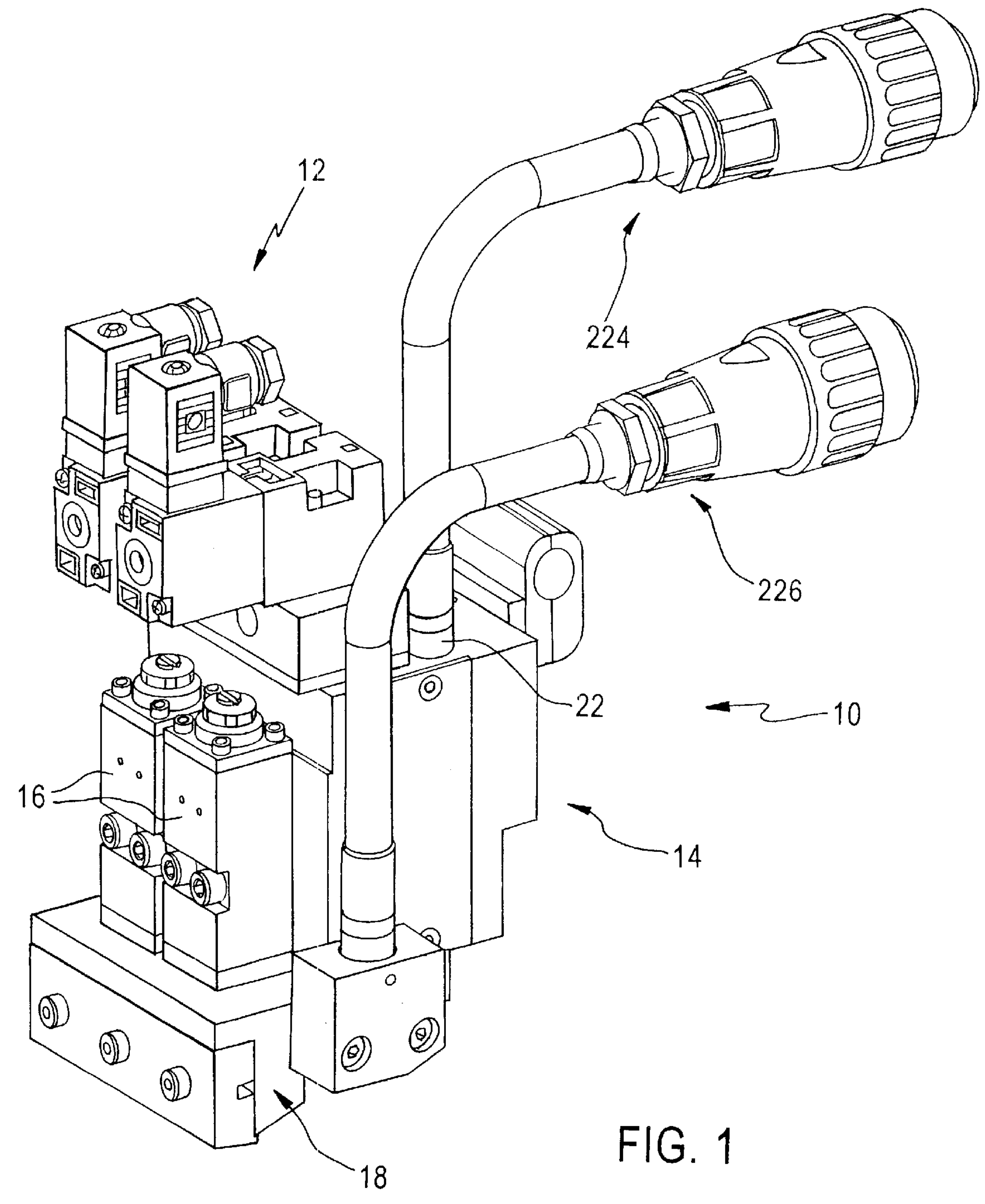
FIG. 1 is a perspective view of one embodiment of a hot melt adhesive applicator constructed in accordance with the principles of the present invention.

FIG. 1 is a perspective view illustration of a hot melt adhesive applicator, generally designated with reference numeral 10, that utilizes solenoid actuated air valves 12 to supply pressurized air through air passages to an adhesive block 14 adapted to receive adhesive material under pressure from an adhesive supply through a heated hose and for discharging the adhesive through applicator valve modules 16 attached to the service block. The pressurized air from the solenoid air valve 12 actuates the applicator valves 16 on and off as desired so as to discharge or stop the discharge of adhesive material from the applicator valve modules 16 into a die block assembly 18 for ultimate discharge into a hot melt groove 20 and out an opening, such as a slot (FIGS. 2 and 3) to a point of application on a substrate. The service block 14 is heated with a heater 22, with electrical power supplied thereto through a service block power assembly 224 in a known manner, while a separate die power and heater assembly 226 heats the die block assembly 18 as a separate heating zone. In accordance with other unique features set forth below, applicator 10 contains a number of improvements designed to minimize the adhesive applicator valve response time, upon activation of the solenoid controlled air valve, and to better control the integrity of the separate heating zones in order to obtain more precise control of the hot melt adhesive application pattern and in particular effecting improved, sharp, cut off and termination of adhesive discharge when the solenoid controlled air valve actuates to close the adhesive applicator valve.

Figure 4:
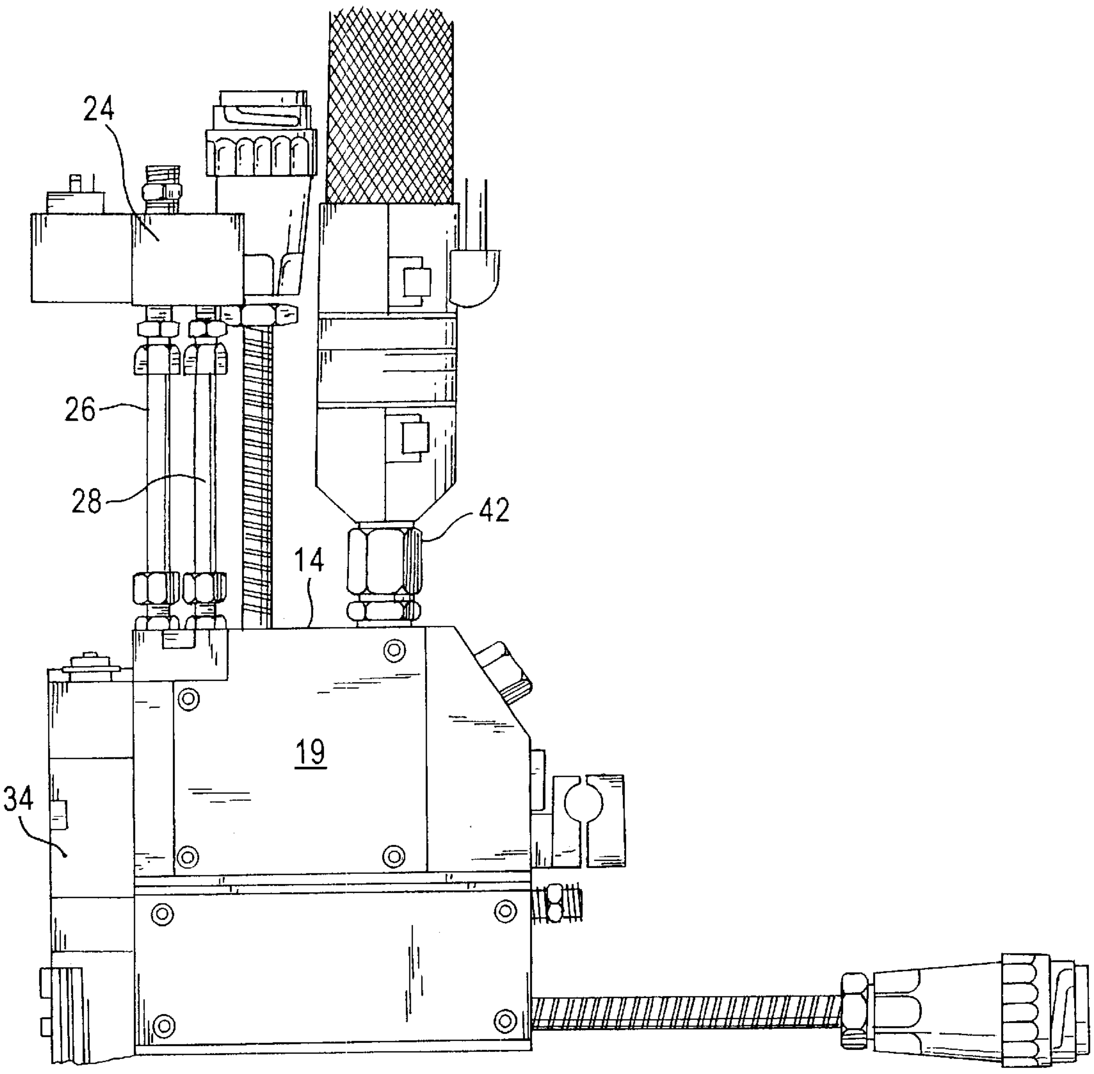
FIG. 4 (PRIOR ART)
FIG. 4 is a perspective view similar to FIG. 1 but of a prior art applicator showing the solenoid air valves remotely located and connected to the service block with air tubes.

In accordance with one improvement feature of this invention, air valve assembly 12 is directly attached to service block 14 through a valve base manifold 228 and a valve insulator element 30, advantageously eliminating the use of air tubes and associated long air paths previously used in prior art applicators as shown in FIG. 4 to pneumatically connect the air valve block to the service block. As noted, this arrangement reduces the path length from the air valve to the adhesive applicator and reduces delay in response of the adhesive applicator when the air valve is actuated to send air to the adhesive applicator valve. More specifically, the valve base manifold 228 is formed with a plurality of air passageways 32 that appropriately align with corresponding passageways 234 in the valve insulator element 30 to enable communication between the one or more solenoid controlled air valves 12 and corresponding passageways 36 in service block 14. The valve base manifold is preferably of elongate rectangular block construction in which an upper surface **28*a* thereof sealingly contacts the bottom surface 12*a* of the air valve(s) blocks while a bottom surface 28*b* of the manifold is in sealing contact with the top surface 30*a* of the insulator element. The bottom surface 30*b* of the insulator element 30 is in flush sealing contact with the upper surface 14*a* of the service block 14. Consequently, the air path defined between the air valve outlets and the service block inlets is defined solely by the combined thickness of the valve base manifold 128 and valve insulator 30** and as noted, the path length has been reduced by the length of the prior art tubes previously used.

The feature of utilizing a valve base manifold 128 and insulator element 30 in place of air tubes advantageously enables the air block 12 to be directly mounted to the service block 14 that is typically heated to operating temperatures between 375–450° F. The insulator element 30 may be made of melamine, phenolic material, and other known materials that prevent the heat from the service block 14 from excessively heating the air valve base manifold 128 which is preferably made of stainless steel. With this arrangement, i.e. in place of long pieces of air tubing, it is possible to decrease the valve response time from, for example, 6–8 milliseconds down to about 4 milliseconds in one proposed commercial embodiment of this invention.

Figure 2:
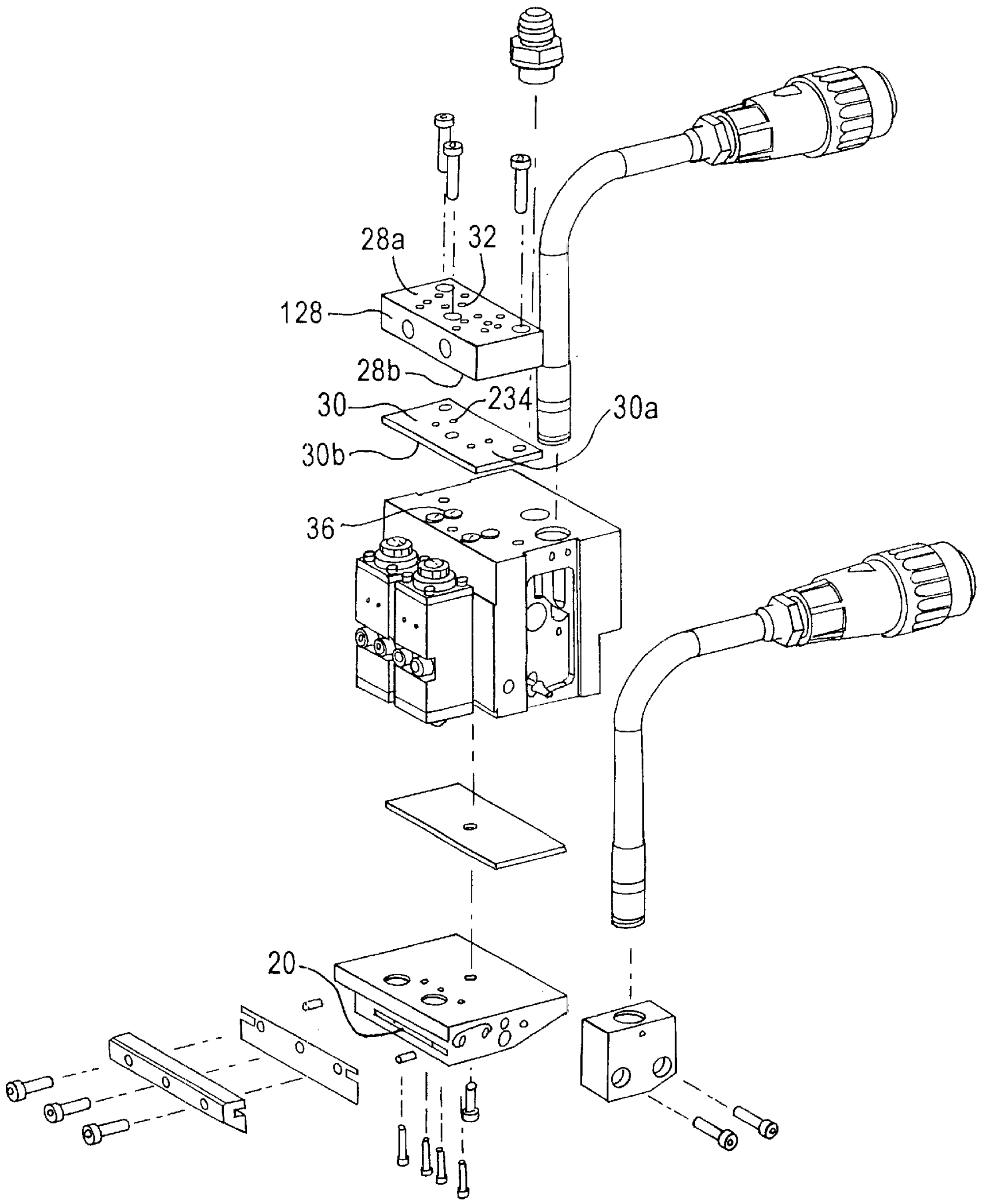
FIG. 2 is an exploded perspective view of the applicator depicted in FIG. 1.
Figure 3:
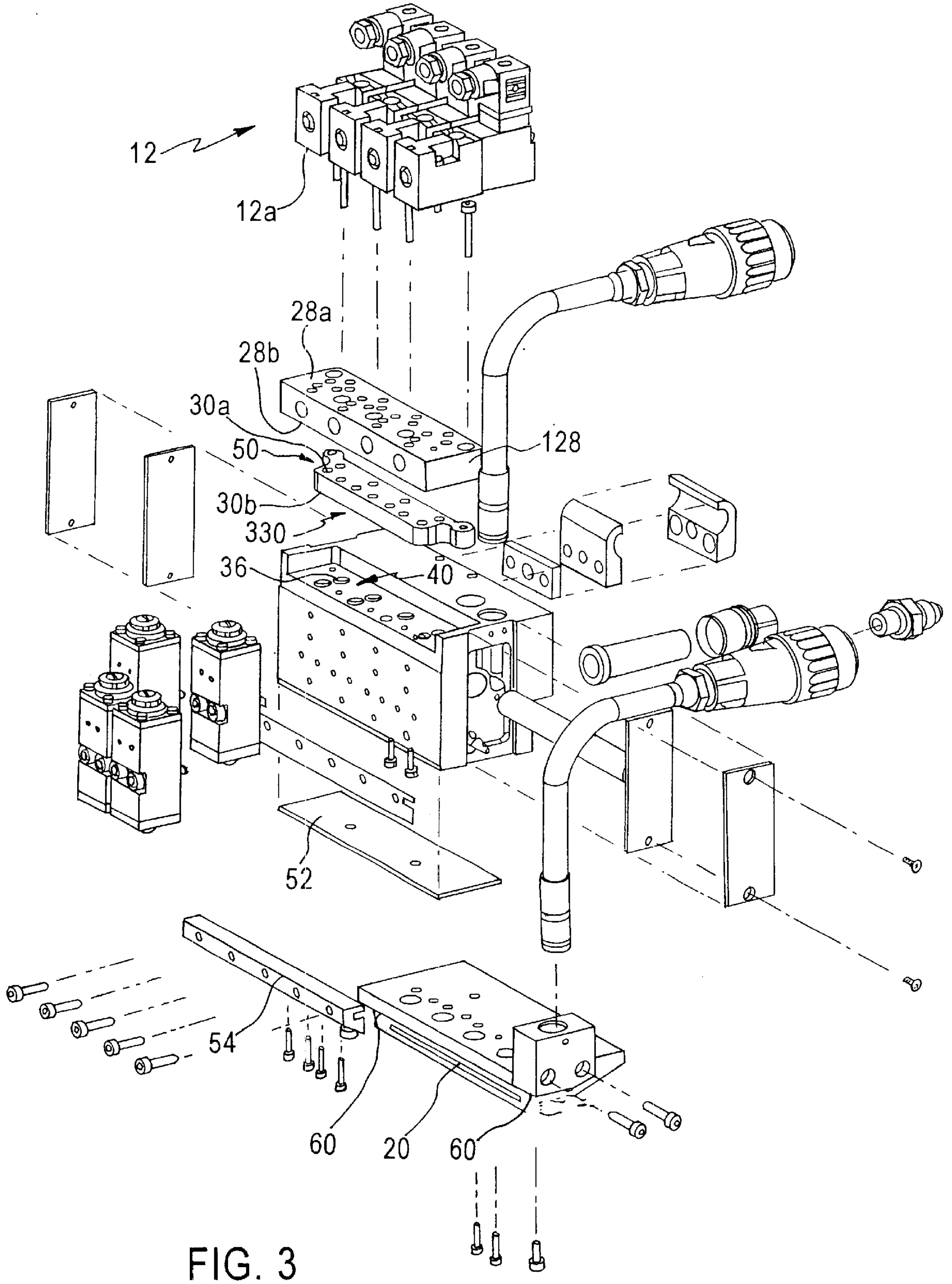
FIG. 3 is an exploded perspective view of a preferred embodiment of the invention.

FIG. 3 is an exploded perspective view illustration of a preferred embodiment of the invention in which an elongate recess 40 is preferably formed in the top surface **14*a* of service block 14 in order to receive the valve insulator element 306 that preferably has the same thickness as the recess depth. The bottom surface 28*b* of the valve base manifold 128 is in turn sealingly flushly mounted to the top surface 30*a* of the insulation element 30. With this arrangement, the length of the air flow path is further decreased in relation to the FIG. 2** embodiment as a result of the recess formation.

Another feature of the FIG. 3 embodiment is that the valve insulator element 330 is formed with cut-outs 50 which, unexpectedly, reduces heat transfer as compared with the rectangular flat block 30 of insulation material such as shown in FIG. 2 embodiment.

Another unique feature of this invention is the provision of a separate die power heating assembly to heat the die block 18 as a separate heating zone. This feature advantageously provides for improved control over adhesive heating conditions within service block 14 as well as better control the heating requirements prevalent in the die block 18. To enable the separate heating zones to operate independently over each other, a thermal insulator plate 52 is disposed between the service block and die assemblies 14,18.

The adhesive supply outlets formed in the die block assembly 18 preferably communicate with the internal hot melt groove 20 as best depicted in FIG. 3. In operation, this groove 20 is covered with a clamp 54 that must be periodically removed to clean the hot melt groove. In accordance with another feature of this invention, a pair of locating pins 60 are disposed at opposite ends of the hot melt groove 20 for reception in corresponding blind bores formed on an interior facing surface (not shown) at opposite ends of the clamp. This enables easy repositioning of the clamp 54 after it is removed to facilitate cleaning and re-assembly.

What is claimed is:

1. A hot melt adhesive applicator comprising:

a heated adhesive service block for receiving adhesive from an adhesive source and having an outlet;

at least one air operated adhesive valve applicator module mounted to the heated adhesive service block and operatively connected to the heated adhesive service block;

at least one solenoid operated air valve mounted directly on the heated adhesive service block and operatively connected to the heated adhesive service block;

at least one heated die block having an inlet communicating with the adhesive applicator valve module through a valve portion of the adhesive applicator valve module and having an adhesive discharge opening;

wherein said heated die block includes a die block heater for separately heating the heateddie block as a separate heating zone from the heated adhesive service block, and further comprising a thermal insulation element positioned between the heated adhesive service block and the heated die block to maintain the integrity of the separate heating zones.

2. A hot melt adhesive applicator comprising:

a heated adhesive service block having internal adhesive and air passages, the adhesive passage having an inlet for receiving adhesive from an adhesive source and having an outlet;

at least one air operated adhesive valve applicator module mounted to the heated adhesive service block and operatively connected to the air and adhesive passages in the adhesive service block;

at least one solenoid operated air valve mounted directly on the heated adhesive service block and operatively connected with the air passage in the heated adhesive service block; and at least one heated die block including an adhesive passage having an inlet communicating with the adhesive passage of the adhesive applicator valve module through a valve portion of the adhesive applicator valve module and said die block adhesive passage having an adhesive discharge opening; wherein said air valve further comprises a valve base manifold to which the air valve is directly mounted to an upper surface thereof, and an insulation element extending between the manifold and the heated adhesive.

3. The applicator of claim 2, wherein said insulation-element has upper and lower surfaces, the upper surface being in direct contact with a lower surface of the valve base manifold and the lower surface being in direct contact with an upper surface of the heated adhesive service block.

4. The applicator of claim 3, wherein the upper surface of the heated adhesive service block includes a recess, and said insulation element is disposed in said recess, said recess operating to shorten an air flow path as measured between an air discharge opening formed in a bottom surface of the air valve and at least one air inlet opening of the air passages in the heated adhesive service block-formed in the upper surface within the recess.

5. The applicator of claim 4, wherein said air flow path is defined solely by the thickness of the valve base manifold and said insulation element.

6. The applicator of claim 5, wherein the thickness of the insulation element is about equal to the depth of the recess.

7. The applicator of claim 4, wherein said insulation element is a plate formed with at least one cutout to reduce surface area contact between the heated adhesive service block and the air valve.

8. The applicator of claim 4, wherein said recess has a depth of about 10 millimeters.

9. The applicator of claim 2, wherein an air flow path between the air valve and the heated adhesive service block is defined solely by the thickness of the valve base manifold and said insulation element.

10. The applicator of claim 2, wherein said insulation element and said valve base manifold are configured to shorten an air flow path and provide a response time of about 4 microseconds.

11. A hot melt adhesive applicator comprising:

a heated adhesive service block having internal adhesive and air passages, the adhesive passage having an inlet for receiving adhesive from an adhesive source and having an outlet;

at least one air operated adhesive valve applicator module mounted to the heated adhesive service block and operatively connected to the air and adhesive passages in the heated adhesive service block;

at least one solenoid operated air valve mounted directly on the heated adhesive service block and operatively connected with the air passage in the heated adhesive service block;

at least one heated die block including an adhesive passage having an inlet communicating with the adhesive passage of the adhesive applicator valve module through a valve portion of the adhesive applicator valve module and said die block adhesive passage having an adhesive discharge opening;

wherein said die block assembly includes a die block heater for separately heating the die block assembly as a separate heating zone from the adhesive service block assembly, and further comprising a thermal insulation element positioned between the adhesive service block and the die block to maintain the integrity of the separate heating zones.

12. The applicator of claim 11, wherein the die block includes a hot melt groove communicating with the discharge opening, and wherein said groove is polished for a sharper shut off.

13. The applicator of claim 12, wherein said groove is polished to about 16 microinches.

14. A hot melt adhesive applicator, comprising:

an adhesive service block having at least one adhesive dispenser module operatively connected thereto for supplying adhesive;

a service block heater connected to heat the adhesive service block and adhesive therein;

at least one air valve operatively connected to the adhesive service block assembly for supplying air to actuate said at least one adhesive dispenser module; and a die block assembly connected to the adhesive service block and including at least one discharge opening to receive the adhesive from the adhesive service block;

wherein said at least one air valve is operatively connected to the adhesive service block assembly through a valve base manifold and a thermal insulation element in which a resulting air flow path between the air valve and adhesive service block is defined solely by the thickness of the valve base manifold and the insulation element.

* * * * *